M. A. McAFEE.
Tethers.
No. 157,530. Patented Dec. 8, 1874.
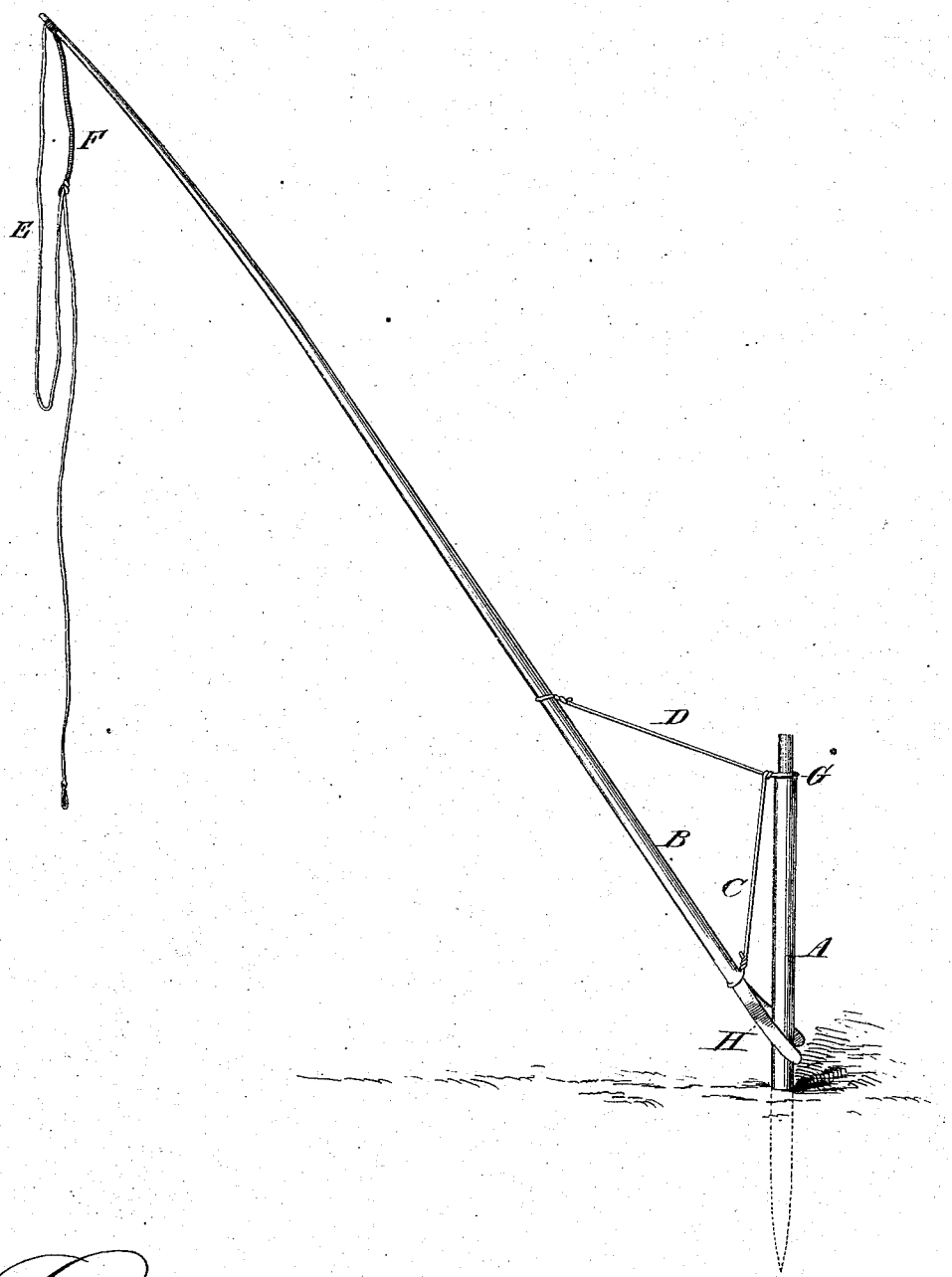

UNITED STATES PATENT OFFICE.

MORGAN A. McAFEE, OF TALBOTTON, GEORGIA.

IMPROVEMENT IN TETHERS.

Specification forming part of Letters Patent No. 157,530, dated December 8, 1874; application filed September 26, 1874.

*To all whom it may concern:*

Be it known that I, MORGAN A. MCAFEE, of Talbotton, Talbot county, Georgia, have invented a new and Improved Stock-Grazer, of which the following is a specification:

My invention consists of a long elastic pole with a hitching-line attached to the small end, the pole being attached by a crotch at the butt; also, a suspending wire attached thereto, and another attached a short distance above to a strong stake driven in the ground, so that it projects upward and outward from the stake, and at the same time revolves around it in such manner as to form an efficient mode of fastening stock to a center, around which they may graze without twisting the rope or becoming entangled in it.

The drawing is a side elevation of my improved stock-grazer.

A is the stake; B, the pole; C and D, the suspending wires; E, the rope, and F the elastic cord. The stake, being about three or four feet high, is driven into the ground, and has a shoulder or groove, G, formed around it near the upper end. The butt end of the pole is split or otherwise crotched at H to rest against the post, so as to swing around it freely. The suspending-wire C is attached to the pole a little above the crotch, and suspended from the other wire D near its connection with the top of the post, and said wire D, being connected to the post at one end, so as to swing around it freely, is connected at the other end to the pole, about as high as the top of the post, to hold said pole, so as to project it as far away from the stake as it can, and at the same time hold the outer end sufficiently high above the ground to be useful for holding the rope E by which the animal is fastened. Thus the apparatus is contrived in a simple and cheap way, so as to hold the hitching-rope above the ground, and at the same time afford a wide range for the animal, and also allow him to travel around the circle without twisting the rope. With the addition of the rubber elastic cord to the rope the range may be greatly extended without the liability of the rope dropping on the ground when the animal ranges under the end of the pole.

Having thus described my invention, I claim as new and desire to secure by Letters Patent—

The combination of the stake A, crotched sweep B, suspending-lines C D, and the hitching-rope, substantially as specified.

MORGAN A. McAFEE.

Witnesses:
JAMES McNEIL,
GEORGE N. FORBES.